US006330428B1

United States Patent
Lewis et al.

(10) Patent No.: US 6,330,428 B1
(45) Date of Patent: Dec. 11, 2001

(54) VOICE QUALITY PERFORMANCE EVALUATOR AND METHOD OF OPERATION IN CONJUNCTION WITH A COMMUNICATION NETWORK

(75) Inventors: Larry D. Lewis, Garland; Chris G. Cooney, Bryan; Matthew J. J. Vea, Rowlett, all of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/220,219

(22) Filed: Dec. 23, 1998

(51) Int. Cl.[7] .................................................. H04B 17/00
(52) U.S. Cl. ........................ 455/67.1; 455/423; 455/67.4; 704/230
(58) Field of Search .................................... 455/67.1, 423, 455/67.2, 67.3, 67.4, 67.6, 424, 425; 375/224; 370/249, 250, 241; 704/230, 212, 224; 379/1.02, 1.03

(56) References Cited

U.S. PATENT DOCUMENTS

| | | | | |
|---|---|---|---|---|
| 5,425,076 | * | 6/1995 | Knippelmier | 379/27 |
| 5,467,341 | * | 11/1995 | Matsukane et al. | 455/67.1 |
| 5,592,468 | * | 1/1997 | Sato | 370/252 |
| 5,784,406 | * | 7/1998 | DeJaco et al. | 455/423 |
| 5,875,397 | * | 2/1999 | Sasin et al. | 455/423 |
| 5,940,439 | * | 8/1999 | Kleider et al. | 455/67.1 |
| 5,974,115 | * | 10/1999 | Chan et al. | 379/27 |
| 5,987,320 | * | 11/1999 | Bobick | 455/423 |
| 6,161,089 | * | 12/2000 | Gardwick | 704/230 |
| 6,169,896 | * | 1/2001 | Sant et al. | 455/424 |
| 6,181,794 | * | 1/2001 | Park et al. | 379/410 |

FOREIGN PATENT DOCUMENTS

| | | | | |
|---|---|---|---|---|
| 97267-A | * | 4/1998 | (JP) . | |
| 36945-A | * | 2/2001 | (JP) | H04B/7/26 |

* cited by examiner

Primary Examiner—William Trost
Assistant Examiner—Tilahun Gesesse
(74) Attorney, Agent, or Firm—Bruce Garlick; James Harrison (57) ABSTRACT

A voice quality performance evaluator includes an interface, memory, processing circuitry and may include a network interface. The interface is adapted to couple to a voice transmission path under test. The memory couples to the interface and is adapted to store an original voice sample and a modified voice sample. The processing circuitry couples to the interface and to the memory, retrieves the original voice sample from the memory and transmits the original voice sample to the voice transmission path under test via the interface. The processing circuitry also receives the modified voice sample via the interface from the voice transmission path under test. Finally, the processing circuitry compares the original voice sample to the modified voice sample in the frequency domain to evaluate the performance of the voice transmission path. In one construction, the voice quality performance evaluator includes a network interface that directs the communication network to complete the voice transmission path from and to the voice terminal. In one type of test that is performed by the voice quality performance evaluator, the voice transmission path includes only a vocoder of a voice terminal. However, in another type of test performed by the voice quality performance evaluator, the voice transmission path further includes a communication network. In one implementation, the original voice sample comprises a plurality of different voice samples. These plurality of different voice samples are separated by time markers. The time markers assist in allowing the voice quality performance evaluator to align the original voice sample and the modified voice sample prior to evaluating same. In performing its analysis, the voice quality performance evaluator divides the original voice sample and the modified voice sample into a plurality of time segments and performs an evaluation for each time segment. The voice quality performance evaluator then accumulates the evaluation for each time segment to produce an evaluation for the complete modified voice sample. Once the evaluation is complete, the voice quality performance evaluator may normalize the evaluation of the voice transmission path to other evaluations.

22 Claims, 7 Drawing Sheets

VOICE QUALITY PERFORMANCE EVALUATOR AND METHOD OF OPERATION IN CONJUNCTION WITH A COMMUNICATION NETWORK

BACKGROUND

1. Technical Field

The present invention relates generally to voice communication networks; and more particularly to a voice quality performance evaluator that objectively evaluates the performance of vocoders used in conjunction with voice communication networks and/or the voice communication networks themselves.

2. Related Art

Communication networks are well known to facilitate voice communications. A prime example of such a communication network is the public switched telephone network (PSTN). The PSTN has evolved greatly since its original creation and continues to service voice communications worldwide. The PSTN typically employs pulse code modulation (PCM) within a circuit switched network to transmit voice communications between users. The PSTN generally sets a level of performance for voice traffic that is used as a benchmark for evaluating the performance of other networks.

Other communication networks that also service voice communications include packet data networks such as the Internet. Packet data networks convert voice signals between the PCM format (as used with the PSTN) and a packet data format or directly from an analog signal to the packet data format. The packet data is then transmitted across the packet data network and reconverted to the PCM format or directly to an analog format at a terminating end. Packet data networks, because they are packet switched and not circuit switched, cannot guarantee bandwidth between two voice users. When sufficient resources exist to service voice communications, the packet data network provides PSTN like voice quality. However, in typical situations, the packet data network cannot service each voice communication with resources that are sufficient to provide PSTN like voice quality. Thus, voice communication users employing the packet data network oftentimes receive inferior performance as compared to the PSTN.

Other examples of communication networks that service voice communications include wireless system networks. Examples of such wireless system networks are cellular systems and satellite systems. These wireless system networks are typically bandwidth limited on the wireless link between the mobile units and base stations (or satellites). Therefore, vocoders are employed to convert voice signals from a standard PCM format (or analog format) to a bandwidth reduced format. The vocoders use compression techniques to code the voice communications at a transmitting end and decode the voice communications at a receiving end. Such coding and decoding often distorts the voice communication, reducing the quality of service provided by the vocoders and the wireless system networks.

Additional problems in the performance of the wireless system networks also reduce the quality of voice communications. A wireless link between the base station (or satellite) and a mobile unit is typically less than one hundred percent reliable. In analog wireless system networks, static is introduced into the voice signal carried over the wireless link. Further, in digital wireless communication networks, frames are often lost over the wireless links. When frames are lost over the wireless links, the vocoders attempt to provide a continuous voice signal to the user. In providing this continuous voice signal, the vocoder fills in missing information with best guess approximations of the voice signal. Such approximations typically provide marginal performance and produce a noticeable degradation in performance.

Other problems affecting the quality of voice communications in wireless system networks (and in systems using a packet data network for part of the transmission link) relate to the operation of the vocoders themselves. Vocoders are designed based upon the fundamentals of human speech patterns. According to their design, the vocoders attempt to perform coding and decoding to maximize voice quality. However, because assumptions regarding speech patterns are invalid under some operating situations, the vocoders provide substandard performance in the operating situations. Examples of such operating situations include teleconferencing, in which multiple voice signals are incoming simultaneously. Assumptions made with respect to a single voice signal are typically invalid when applied to multiple voice signals.

Because of the many shortcomings in voice communications identified above, it is desirable to grade the voice communication performance of vocoders and communication networks. However, such evaluation is difficult to perform due to the great complexity of the voice communications themselves. Thus, a typical technique for grading the performance of vocoders and communication networks has been to use a panel of observers to subjectively grade the performance of the vocoders and communication networks. From the subjective grades obtained, a Mean Opinion Scoring (MOS) number is obtained for each of a plurality of vocoders and/or communication networks under test. Then, the MOS numbers are averaged and compared to one another to arrive at a relative rank for each device under test.

The MOS technique suffers from many shortcomings. Since the MOS testing requires substantial time to accomplish, the observers must be compensated for their time and must be reliable enough to provide unbiased results over a period of time. Further, because differing panels of observers are used to test different vocoders and systems, test results are generally not reproducible and relative ranks of devices often vary over time.

Thus, there is a need in the art for a device that evaluates the performance of vocoders and/or communication networks for voice communications.

SUMMARY OF THE INVENTION

Thus, to overcome the shortcomings of the prior systems, among other shortcomings, in evaluating the voice quality of terminal units and communication systems, a voice quality performance evaluator constructed according to the present invention performs an analysis in the frequency domain. By performing an evaluation of voice operating characteristics in the frequency domain, an objective and repeatable evaluation may be performed on any signal path. Such signal paths may include not only terminal units (and the vocoders contained therein) but of coupled communication systems as well.

The voice quality performance evaluator includes an interface, memory, processing circuitry and may include a network interface. The interface is adapted to couple to a voice transmission path under test. The memory couples to the interface and is adapted to store an original voice sample and a modified voice sample. The processing circuitry couples to the interface and to the memory, retrieves the original voice sample from the memory and transmits the original voice sample to the voice transmission path under test via the interface. The processing circuitry also receives the modified voice sample via the interface from the voice transmission path under test. Finally, the processing circuitry compares the original voice sample to the modified voice sample in the frequency domain to evaluate the performance of the voice transmission path. In one construction, the voice quality performance evaluator includes a network interface that directs the communication network to complete the voice transmission path from and to the voice terminal.

In one type of test that is performed by the voice quality performance evaluator, the voice transmission path includes only a vocoder of a voice terminal. However, in another type of test performed by the voice quality performance evaluator, the voice transmission path further includes a communication network.

In one implementation, the original voice sample comprises a plurality of different voice samples. These plurality of different voice samples are separated by time markers. The time markers assist in allowing the voice quality performance evaluator to align the original voice sample and the modified voice sample prior to evaluating same.

In performing its analysis, the voice quality performance evaluator divides the original voice sample and the modified voice sample into a plurality of time segments and performs an evaluation for each time segment. The voice quality performance evaluator then accumulates the evaluation for each time segment to produce an evaluation for the complete modified voice sample. Once the evaluation is complete, the voice quality performance evaluator may normalize the evaluation of the voice transmission path to other evaluations.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1A:
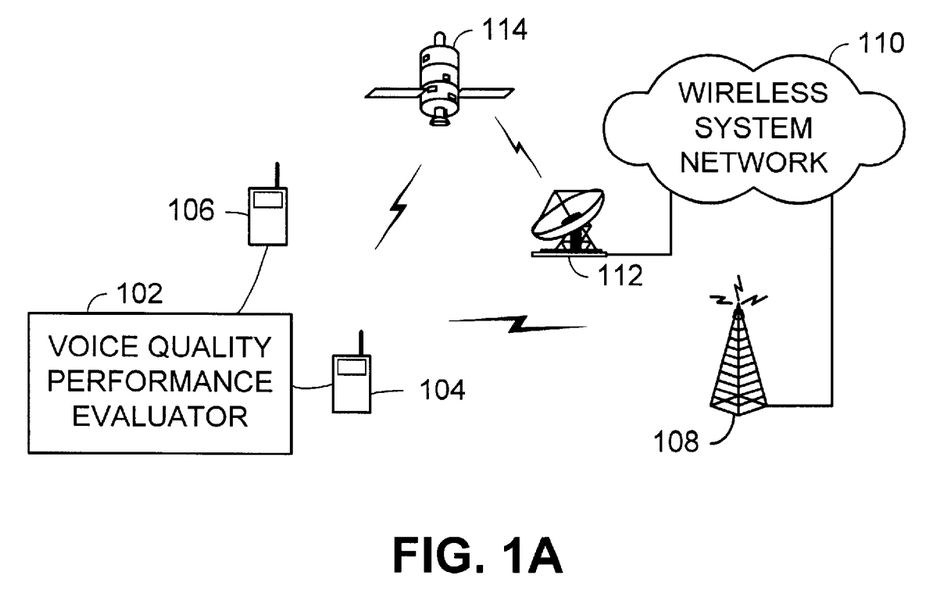
FIG. 1A is a diagram illustrating generally a voice quality performance evaluator constructed according to the present invention and its interconnection to a mobile unit that is supported by a wireless communication network.

FIG. 1A is a diagram illustrating generally a voice quality performance evaluator (VQPE) 102 constructed according to the present invention and its interconnection to a mobile unit 104 that is supported by a wireless communication network. In one construction, the wireless communication network is a cellular system in which a plurality of base stations, such as base station 108, operate in conjunction with a wireless system network 110 to support wireless communications within a service area. In such a cellular wireless communication network, the mobile unit 104 establishes a wireless link with one or more proximately located base stations. The wireless system network 110 routes the voice communication to another mobile unit (e.g., mobile unit 106) or via the public switched telephone network (PSTN) or another communication network to a remotely located terminal.

In an alternate construction of the wireless communication network, the wireless communication network is a satellite system. In the satellite system, an earth station 112 and a satellite 114 support a wireless link between the mobile unit 104 and the wireless system network 110. The wireless system network 110 couples to the earth station 112 and routes the communication to another mobile unit (e.g., mobile unit 106) or to a remotely located terminal (e.g., a phone coupled to the PSTN).

According to the present invention, the VQPE 102 couples to mobile unit 104 to evaluate the voice quality of communications supported by the mobile unit 104 in conjunction with the wireless communication network. Thus, in the application, the VQPE 102 evaluates only the performance of the mobile unit 104. Thus, in the operation, no errors are introduced by the wireless communication network on either the wireless link or within the wireless network 110. When the mobile unit 102 is proximate to a base station 108 during a light loading period, the wireless communication network may support operation with substantially no errors.

In another operation according to the present invention, the VQPE 102 evaluates the performance of the wireless communication network in servicing the voice communications. This performance may be evaluated by having knowledge of the performance of the mobile unit 104 without the introduction of errors by the wireless communication. With this knowledge, any degradation in performance of the mobile unit 104 as compared to its performance in a wireless communication network without errors may be attributable to the wireless communication network.

In still another operation, the VQPE 102 evaluates the voice quality of communications supported by the combination of the mobile unit 102 and the wireless communication network 110. Such investigation is useful to compare the performance of differing types of systems to one another within overlaying service areas. For example, in service areas in which an analog wireless communication network, a Time Division Multiple Access (TDMA) Wireless communication network and a Code Division Multiple Access (CDMA) communication network overlay one another. However, differing types of mobile units are required to operate in conjunction with each of the systems. Thus, by using the VQPE 102, overall performance provided by each system with a comparable quality level mobile unit may be objectively compared and contrasted. Such comparisons are useful in marketing and in determining what type of system to deploy.

In an operation according to the present invention, the VQPE 102 transmits original voice samples to the mobile unit 104. The mobile unit 104 codes the original voice samples and transmits the coded voice samples across the wireless link (via the satellite 114 and earth station 112 or the base station 108) to the wireless system network 110. The wireless system network 110 then returns the coded voice samples to the mobile unit 104 via the wireless link. In returning the coded voice samples, the wireless communication network may have introduced errors. The mobile unit 104 receives the coded voice samples, decodes the voice samples to produce modified voice samples and returns the modified voice samples to the VQPE 102. The VQPE 102 then processes the modified voice samples in conjunction with the original voice samples to evaluate the voice performance of the mobile unit 104 and wireless communication network performance.

In an alternative operation, the wireless communication network returns the coded voice samples to the mobile unit 106. In such case, two separate signal paths may be established, a first signal path for signals to be transmitted by mobile unit 104 to mobile unit 106 and a second signal path for signals transmitted by mobile unit 106 to mobile unit 104. Should the mobile units 104 and 106 be of identical construction, an average of the performance of the signal paths may be determined.

Figure 1B:
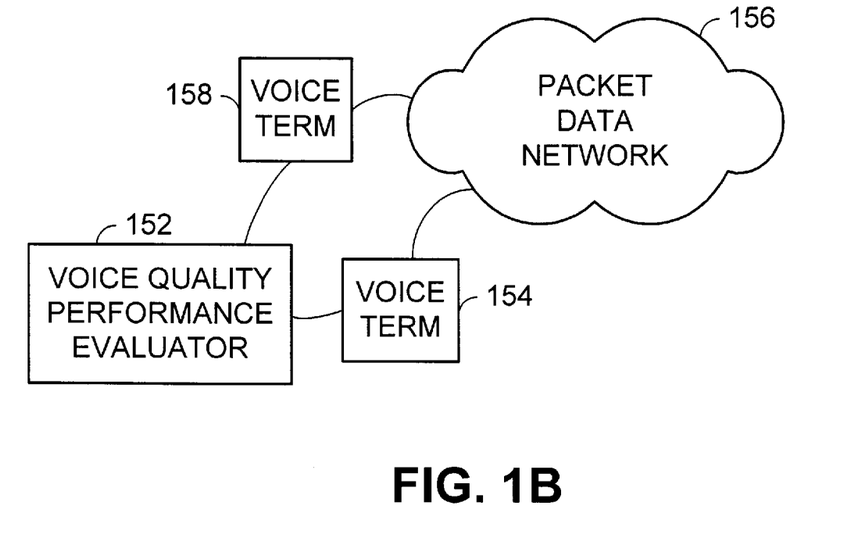
FIG. 1B is a diagram illustrating generally a voice quality performance evaluator constructed according to the present invention and its interconnection to a voice terminal that is supported by a wired communication network.

FIG. 1B is a diagram illustrating generally a VQPE 152 constructed according to the present invention and its interconnection to a voice terminal 154 that is supported by a wired communication network. As compared to the application of FIG. 1C, the VQPE 152 is employed to evaluate the performance of voice terminals 154 and 158 and/or a packet data network 156. The voice terminals 154 and 158 perform vocoding operations to convert original voice samples from a PCM format (or analog format) to a format compatible with the packet data network 156. Because the vocoding process may reduce the effective bandwidth provided for voice communications, the voice terminals 154 and 158 and the packet data network 156 are subject to evaluation of voice communication performance as was the wireless system network of FIG. 1A. However, in most tests, the packet data network 156 will provide little or no error. Therefore, the voice terminals 154 and 156 are primarily under test.

Operation of a test of the VQPE 152 of FIG. 1B proceeds substantially according to the operations described with reference to FIG. 1A. Thus, voice samples are transmitted from the VQPE 152 to the voice terminal 154 which codes the voice samples and transmits them to the packet data network 156. The packet data network 156 then returns the coded voice samples to the voice terminal 154 (or to voice terminal 158) for decoding. The decoding process produces the modified voice samples which are returned to the VQPE 152. The VQPE then processes the modified voice samples to evaluate the performance of the voice terminal 154 and/or the packet data network 156.

Figure 2:
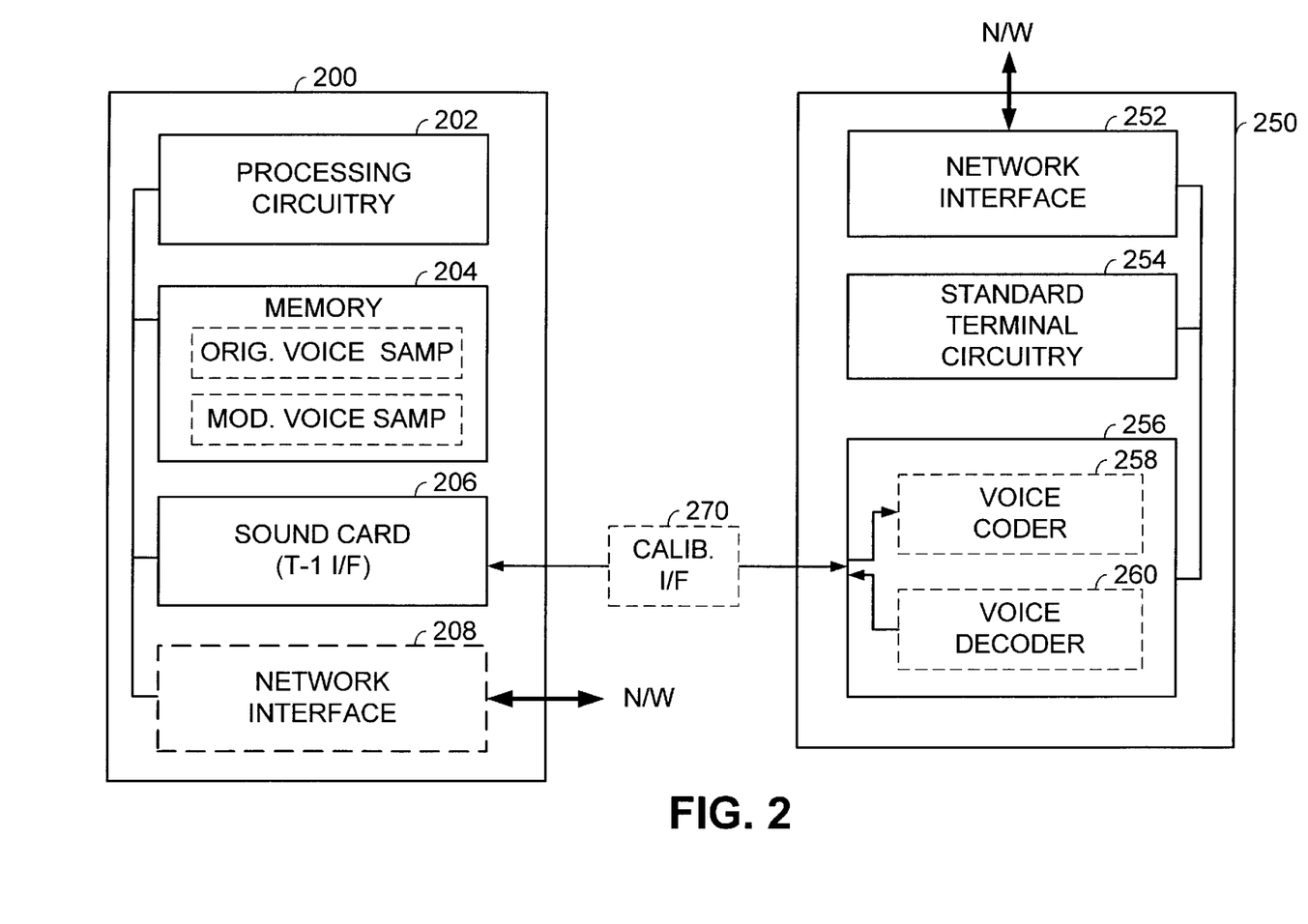
FIG. 2 is a block diagram illustrating a voice quality performance evaluator constructed according to the present invention and its interconnection to a voice terminal supported by a communication network.

FIG. 2 is a block diagram illustrating a VQPE 200 constructed according to the present invention and its interconnection to a voice terminal 250 supported by a communication network. As is shown, the VQPE 200 includes processing circuitry 202, memory 204 and a sound card 206. The sound card may support analog communications and/or digital communications (e.g., T-1 interface communications) with the voice terminal 250. The VQPE 200 may also include a network interface 208 that interfaces the VQPE 200 to the communication network. These components are intercoupled to one another so the VQPE 200 may perform operations according to the present invention.

Stored in the memory 204 of the VQPE 200 are original voice samples. These original voice samples are samples of voice communications that are used to evaluate the performance of the voice terminal and/or the coupled network. In one embodiment, the original voice samples are stored in a .WAV format and include 100 seconds of speech. The 100 seconds of speech include speech samples from 20 speakers (5 seconds each) that are separated by time markers. However, in other embodiments, a greater number of speech samples may be employed with the total duration more than, or less than 100 seconds.

The voice terminal 250 includes a network interface 252 which interfaces the voice terminal 250 to a wireless or wired network. In the case of a wireless system network, the network interface 252 includes an RF transceiver. In the case of a wired network, the network interface 252 includes a T-1 interface card, an ISDN card, an Ethernet card or another wired network interface. The construction of such interfaces is known. The voice terminal 250 also includes standard terminal circuitry 254 and a vocoder 256. The vocoder 256 includes a voice coder 258 which receives voice signals from the VQPE 200 in an analog or digitized format (e.g., PCM) and codes the voice signals to produce coded voice signals. The vocoder 256 also includes a voice decoder 260 that decodes coded voice signals received from the coupled network to produce modified voice signals. A calibration interface 270 may be reside between the VQPE 200 and the voice terminal 250 and be employed to normalize the amplitude of signals transmitted between the devices.

During a typical operation, the processing circuitry 202 of the VQPE 200 retrieves original voice samples from memory 204 and writes the original voice samples to the sound card 206. The sound card 206 converts the original voice samples into a format that may be received by the vocoder 256 of the voice terminal 250. The vocoder 256 of the voice terminal 250 receives the original voice samples and codes the original voice samples. The voice terminal 250 then transmits the coded samples to the network via the network interface 252.

Based upon a command provided by the voice terminal 250 or the VQPE 200 (via the network interface 208), the network returns the coded samples to the voice terminal 250 via the network interface 252. The voice terminal 250 receives the coded samples and decodes the coded samples via its decoder 260 to produce the modified voice samples. The vocoder 256 then provides the modified voice samples the VQPE 200 via the sound card 206 of the VQPE 200. The sound card 206 of the VQPE 200 converts the modified voice samples to a storable format and the processing circuitry directs the storage of the modified voice samples in memory 204. Subsequently, the VQPE 200 processes the original voice samples and modified voice samples to evaluate the voice quality performance of the voice terminal 250 and/or the performance of the coupled network.

Figure 3:
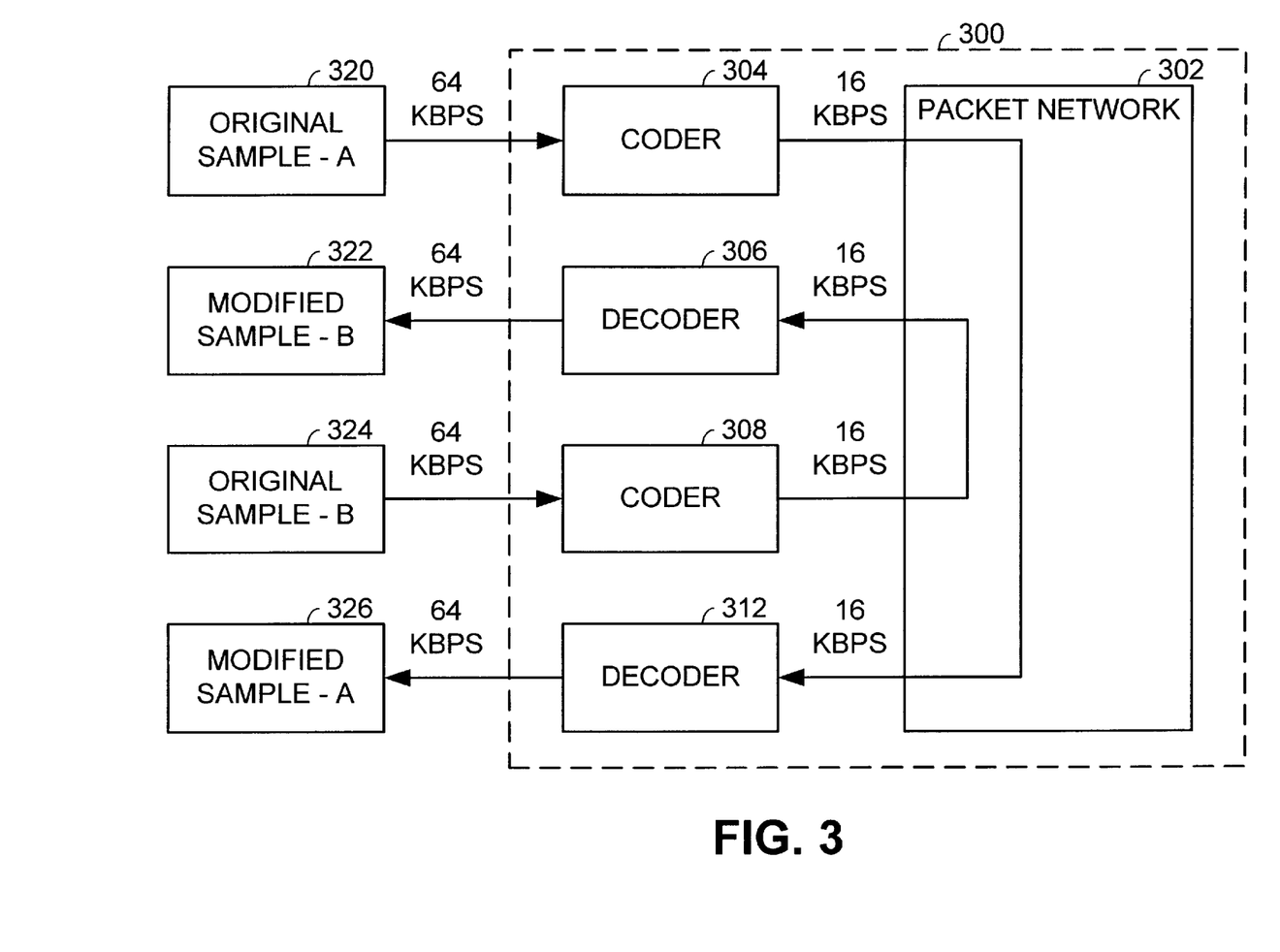
FIG. 3 is a block diagram illustrating generally the path of voice samples through a vocoder and coupled voice communication network upon which testing is performed according to the present invention.

FIG. 3 is a block diagram illustrating generally the path of voice samples upon which testing is performed according to the present invention to evaluate performance of a voice terminal and/or a communication network. The combination of the voice terminal and communication network is represented as a black box 300. As was previously described, vocoders affect the quality of voice signals and communication networks may affect the quality of voice signals if the communication networks fail to deliver the voice signals in a satisfactory manner.

A first signal path converts original voice sample—A 320 into modified voice sample—A 326. The first signal path includes voice terminal path segments and network path segments. As is shown, original voice sample—A 320 is provided to the coder 304 of the black box 300 at a data rate of 64 KBPS. The coder 304 codes the original voice sample—A 320 to a coded signal at a data rate of 16 KBPS. Such data rate conversion is standard in many communication networks in which communications are packetized and transmitted via a packet data network 302. The coded original voice sample—A 320 is then transmitted via the packet network 302 to decoder 312 which converts the coded sample into modified voice sample—A 326 at a data rate of 64 KBPS.

A second signal path converts original voice sample—B 324 into modified voice sample—B 322. The second signal path includes voice terminal path segments and network path segments. As is shown, original voice sample—B 324 is provided to the coder 308 of the black box 300 at a data rate of 64 KBPS. The coder 308 codes the original voice sample—B 324 to a coded signal at a data rate of 16 KBPS. The coded original voice sample—B 324 is then transmitted via the packet data network 302 to decoder 306 which converts the coded sample into modified voice sample—B 322 at a data rate of 64 KBPS.

When the packet network 302 passes all coded signals between the coders 304, 308 and decoders 306 and 312 without error or delay, the performance of the coders and decoders is being investigated solely. However, when the packet network 302 drops packets or otherwise provides less than perfect service, the packet network 302 contributes to the performance along the signal path. Thus, in such case, the combination of the coders, decoders and the signal paths are being evaluated.

Figure 4:
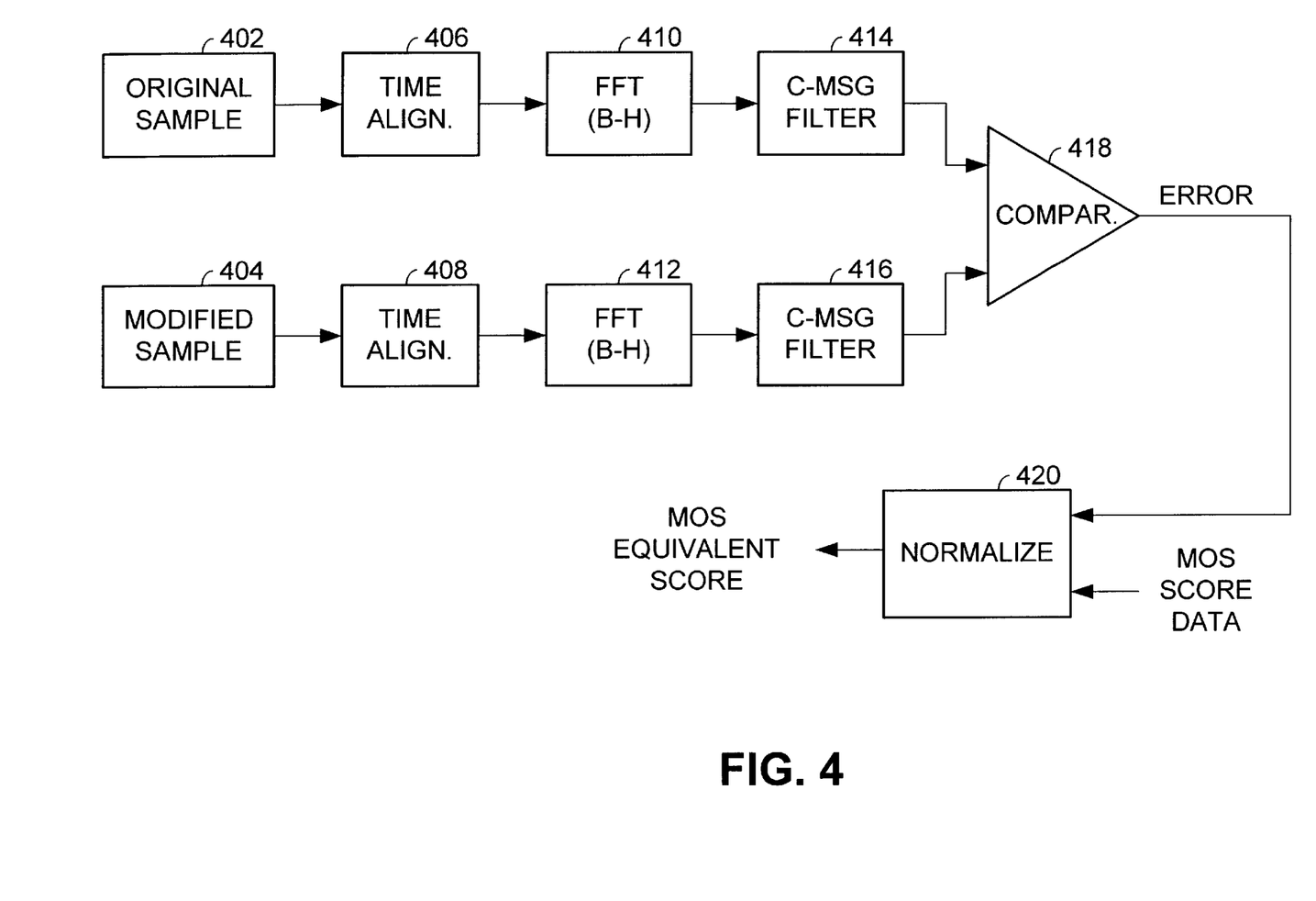
FIG. 4 is a signal flow diagram illustrating operations according to the present invention employed to evaluate the quality of modified voice samples that have been operated upon by a vocoder and/or a communication network.

FIG. 4 is a signal flow diagram illustrating operations according to the present invention employed to evaluate the quality of modified voice samples that have been operated upon by a vocoder and/or a communication network. As will be discussed further with referenced to FIGS. 6A and 6B, the original voice samples and modified voice samples comprise voice samples of a certain duration in time. In one embodiment, the duration of approximately 100 seconds. These voice samples are segregated into time segments. Operation described with reference to FIG. 4 refers to these time segments of the voice samples.

As is shown, the original voice samples 402 and modified voice samples are first time aligned at time alignment blocks 406 and 408, respectively. Because the original voice samples 402 and the modified voice samples 404 extend over time, and time segments of the samples are to be compared, the time alignment blocks 406 and 408 align the samples in time so that time segments of the samples may be subsequently compared. In one embodiment, 40 ms segments of the original voice sample 402 and modified voice sample 404 are considered, one 40 ms segment at a time.

The original voice samples 402 and modified voice samples 404, after being aligned in time, are transformed to the frequency domain using fast Fourier transform (FFT) blocks 410 and 412, respectively. According to the present invention, each 40 ms segment of the voice samples is first conditioned with Blackman-Harris window prior to being transformed. Once the samples are transformed, they are filtered using a C-MSG filter at blocks 414 and 416, respectively. Then, the transformed and filtered samples are compared at comparator 418 to produce an error signal. In one particular embodiment, a mean error signal across the frequency band of the FFT converted signal is considered. The error signal may then be normalized using MOS score data at normalization block 420 to produce an MOS equivalent score. Such MOS score data may have been obtained using a known evaluation of the vocoder/communication network under test.

Figure 5:
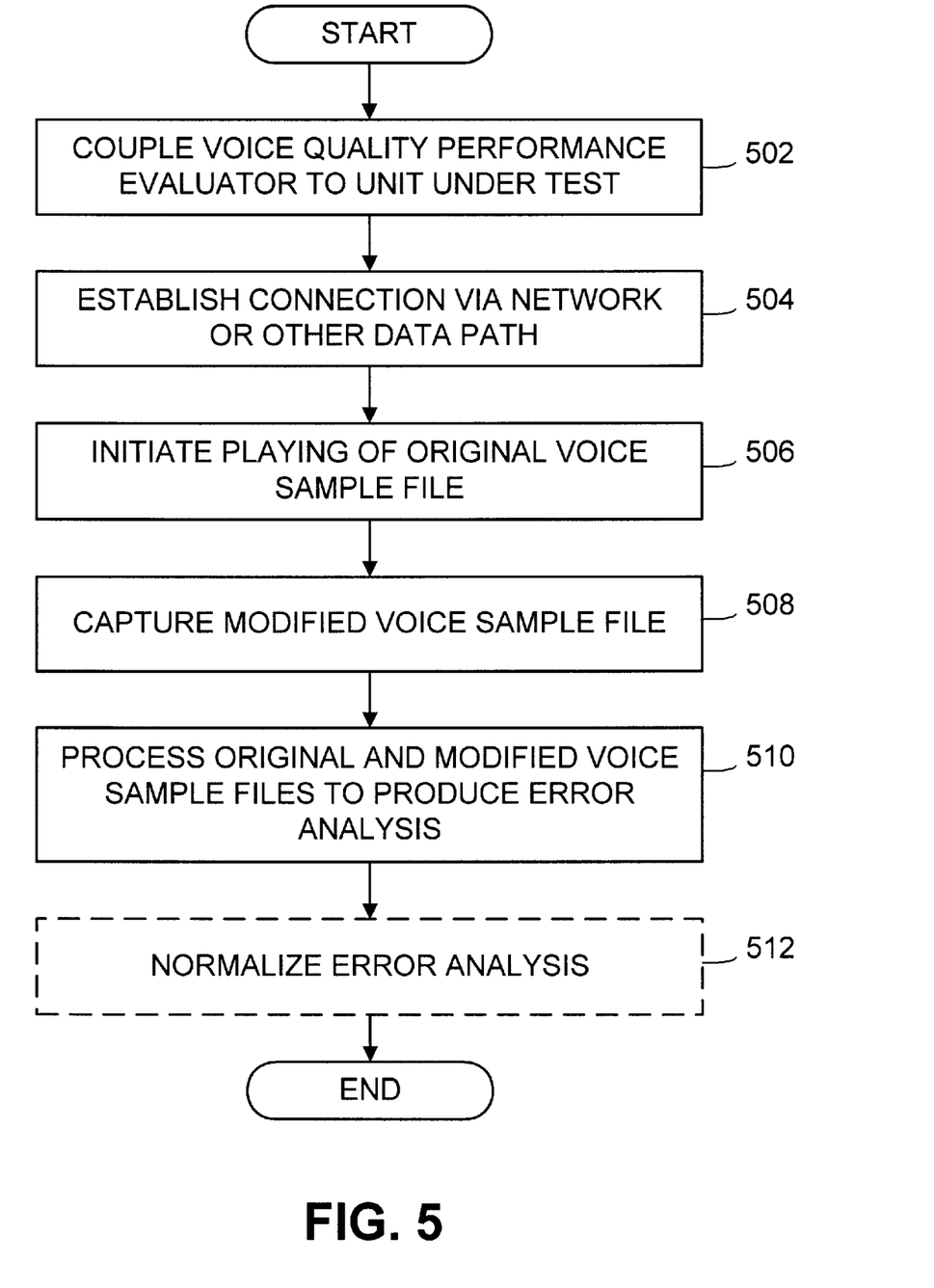
FIG. 5 is a logic diagram illustrating generally operation according to the present invention in testing the performance of a vocoder and/or a communication network.

FIG. 5 is a logic diagram illustrating generally operation according to the present invention in testing the performance of a vocoder and/or a communication network under test. Operation commences at step 502 wherein a VQPE is coupled to a voice terminal (unit) under test. Then, a connection is established via a network or other data path at step 504. When only the voice terminal is being evaluated, a direct path may be established from the voice terminal to itself. By establishing this type of connection, a coupled network introduces no distortion or error into the signal path.

At step 506, the original voice sample is played from the VQPE to the voice terminal. This original voice sample, in one embodiment, is approximately 100 seconds in duration and includes 20 distinct voice samples that are separated by timer markers. These time markers are used later to align the original voice sample to a modified voice sample. Once the original voice sample is played, and during the period that the original voice sample is being played, the modified voice sample file is captured by the VQPE at step 508. Once the complete modified voice sample is captured at step 508, operation proceeds to step 510 where the original voice sample and the modified voice sample are processed to produce an error analysis. This error analysis may then be normalized to produce a normalized result.

Figure 6A:
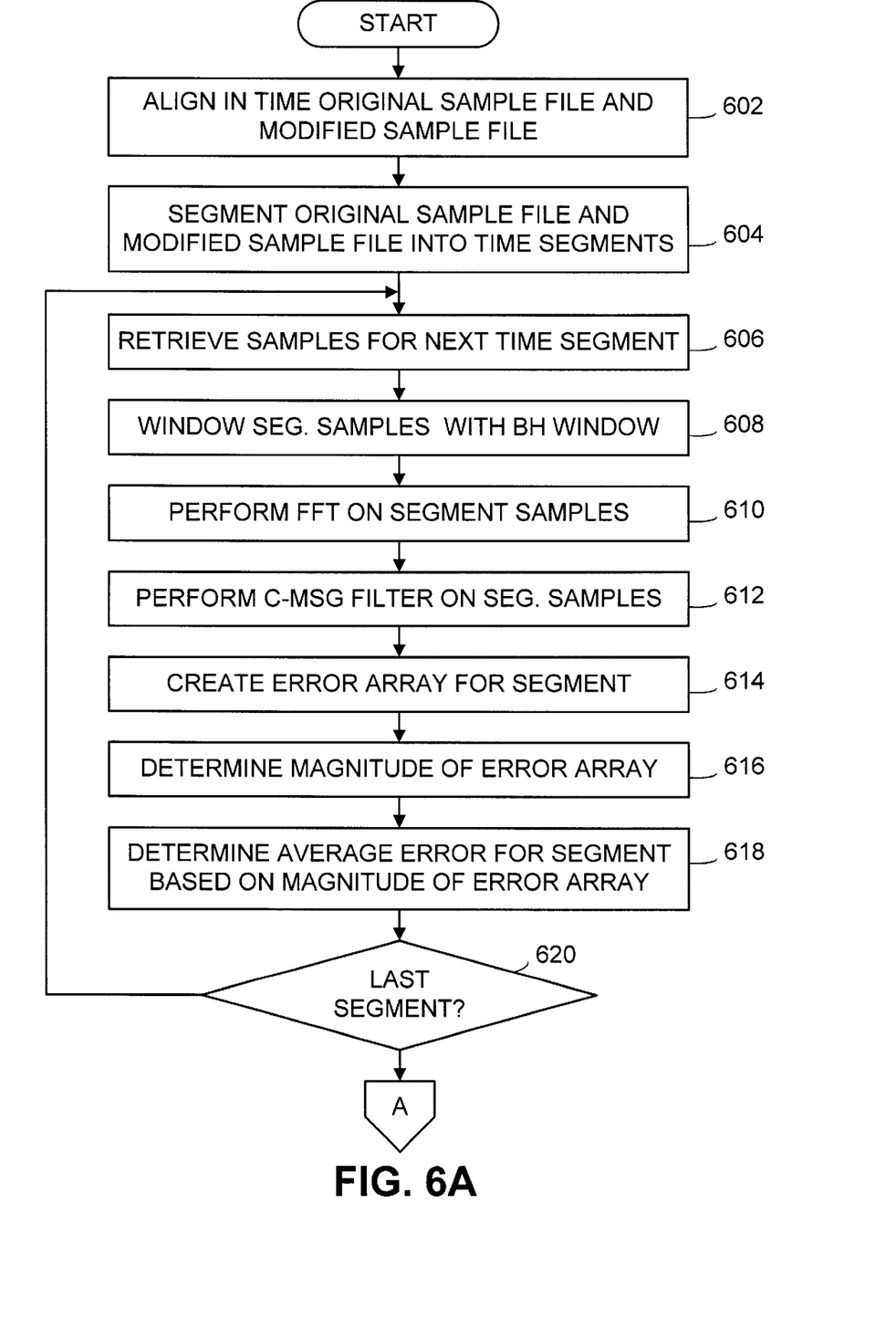
FIGS. 6A and 6B are logic diagrams illustrating operations according to the present invention employed to evaluate voice samples captured according to the present invention in order to evaluate the performance of a vocoder and/or a communication network.
Figure 6B:
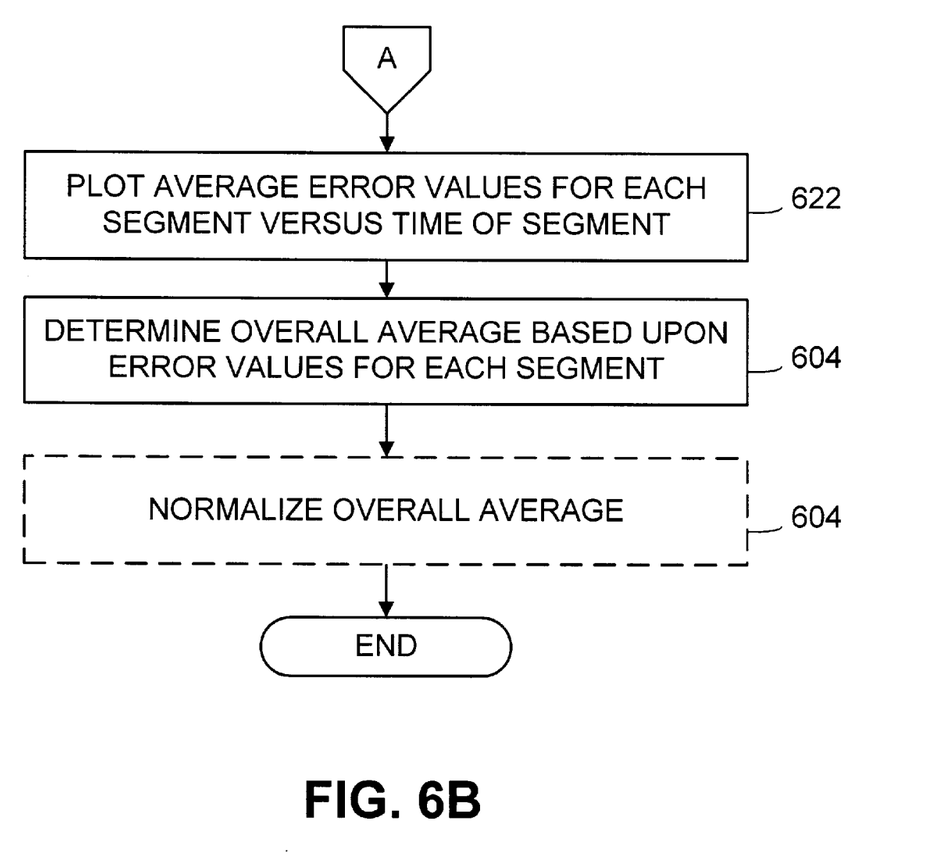

FIGS. 6A and 6B are logic diagrams illustrating operations according to the present invention employed to process voice samples captured according to the present invention in order to evaluate the performance of a vocoder and/or a communication network. Operation commences at step 602 wherein the original voice sample and the modified voice sample are aligned in time so that voice components contained therein are aligned. Operation proceeds to step 604 where the original voice sample and the modified voice sample are segmented into an equal number of time segments. In one embodiment, the samples are segmented into 40 ms time segments, such 40 ms time segments corresponding to the length of two time division multiple access (TDMA) data frames in a wireless communication network. In another embodiment, time segments are selected such that adjacent time segments overlap one another by an overlap duration, e.g., 10 ms. By overlapping the time segments, the stability of the algorithm is enhanced.

At step 606 a corresponding time segment pair is retrieved from the original voice sample and the modified sample. The samples are then windowed using a Blackman-Harris window at step 608. Windowing the samples conditions the time-domain samples for the frequency domain, altering main lobe and side lobe characteristics. The Blackman-Harris window provides much attenuation for the undesired side lobes, while still maintaining a narrow enough main lobe.

Then, at step 610, the fast Fourier transform (FFT) for the modified voice sample segment and original voice sample segments are calculated. The FFT transforms the time-domain samples to the frequency domain. The spectral characteristics shows the power intensity at the frequencies in the desired range which is the standard 4 kHz bandwidth, making the necessary sampling frequency 8 kHz as required by the Nyquist theorem. The FFT length is 8192 which provides a resolution of (sampling frequency)/(FFT length)= 8000/8192=0.9766 Hz. Thus, the FFT output array will provide values spaced by 0.9766 Hz. Because aliasing occurs after 4000 Hz, as provided for by the Nyquist theorem, only the first half of the 8192 data points are valid. These data points constitute a frequency range of 0 to 4000 Hz.

Next, at step 612, the FFT values are passed through a C-MSG filter to emphasize the frequencies that are most important to human hearing. At step 614, an error array is then created by subtracting the FFT values for the original voice sample segment from the FFT values for the modified voice sample segment, or vice versa. Then, at step 616, the magnitude of the FFT array by first determining the magnitude of the FFT values and then by using a modified trapezoidal rule to determine the area under the curve created by the magnitude of the FFT values. Next, at step 618, an average error for the segment is determined and added to the total error for the modified voice sample file to keep a running error number.

In an alternate embodiment of steps 614 through 618, each individual datapoint (magnitude) of the FFT values is compared (original versus modified) and an error value is calculated. The average of all of these differences for the current time segment is then calculated. This value is then determined to be the average error for the segment at step 618 and is added to the total error for the modified voice sample file to keep a running error number.

At step 620 it is determined whether the segment under consideration is the last segment to be considered. If not, operation returns to step 606. If so, operation proceeds via off-page connector to step 622 of FIG. 6B where the average error value for each segment is plotted versus time for the complete modified voice sample file. Then, at step 604, the overall error for the modified voice sample file is determined based upon the error for each segment. Finally, optionally, at step 604, the overall error score is normalized. Such normalization may be performed using MOS data that was previously collected for the voice terminal and/or communication network under test.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A voice quality performance evaluator employed to evaluate the performance of a voice transmission path, the voice quality performance evaluator comprising:

an interface adapted to couple to a voice transmission path under test;

memory coupled to the interface adapted to store an original voice sample, wherein the original voice sample includes a plurality of original voice sample segments;

processing circuitry coupled to the interface and to the memory that retrieves the original voice sample from the memory and that transmits the original voice sample on the voice transmission path under test via the interface;

the processing circuitry receiving a modified voice sample via the interface from the voice transmission path under test, wherein the modified voice sample includes a plurality of modified voice sample segments that correspond to the plurality of original voice sample segments;

the processing circuitry performing time alignment to align each of the plurality of original voice sample segments with its corresponding modified voice sample segments; and the processing circuitry comparing the original voice sample to the modified voice sample in the frequency domain to evaluate the performance of the voice transmission path, wherein in comparing the original voice sample to the modified voice sample, the processing circuitry compares each original voice sample segment with its corresponding modified voice sample segment.

2. The voice quality performance evaluator of claim 1, wherein the voice transmission path comprises a vocoder of a voice terminal.

3. The voice quality performance evaluator of claim 2, wherein the voice transmission path further comprises a communication network.

4. The voice quality performance evaluator of claim 3, further comprising a network interface that directs the communication network to complete the voice transmission path from and to the voice terminal.

5. The voice quality performance evaluator of claim 1, wherein the plurality of original voice sample segments comprise actual voice samples taken from a plurality of speakers.

6. The voice quality performance evaluator of claim 5, wherein the plurality of original voice sample segments are separated by a plurality of time markers.

7. The voice quality performance evaluator of claim 1, wherein the processing circuitry performs Fourier transforms on the original voice sample and the modified voice sample.

8. The voice quality performance evaluator of claim 1, wherein:

each of the plurality of original voice sample segments is taken from a corresponding respective speaker; and the plurality of voice sample segments have diverse speech characteristics.

9. The voice quality performance evaluator of claim 8, wherein the processing circuitry accumulates the evaluation for each of the plurality of original voice sample segments to produce an evaluation for the complete modified voice sample.

10. The voice quality performance evaluator of claim 1, wherein the processing circuitry normalizes the evaluation of the voice transmission path to other evaluations.

11. A method of evaluating the performance of a voice signal path, the method comprising:

transmitting an original voice sample onto the voice signal path, wherein the original voice sample includes a plurality of original voice sample segments;

receiving a modified voice sample from the voice signal path, the modified voice sample corresponding to the original voice signal, wherein the modified voice sample includes a plurality of modified voice sample segments that correspond to the plurality of original voice sample segments;

aligning in time each of the plurality of original voice sample segments with its corresponding modified voice sample segments;

transforming the plurality of modified voice sample segments and the plurality of original voice sample segments to the frequency domain; and comparing the spectral components of the transformed plurality of modified voice sample segments to the spectral components of the transformed plurality of original voice sample segments to evaluate the performance of the voice transmission path.

12. The method of claim 11, wherein the voice transmission path passes through a vocoder of a voice terminal.

13. The method of claim 12, wherein the voice transmission path further passes through a communication network.

14. The method of claim 13, further comprising directing the communication network to complete the voice transmission path from and to the voice terminal.

15. The method of claim 11, wherein the plurality of original voice sample segments contain actual voice samples taken from a plurality of speakers.

16. The method of claim 15, wherein the plurality of original voice sample segments are separated by a plurality of time markers.

17. The method of claim 11, wherein transforming the modified voice sample and the original voice sample to the frequency domain includes performing Fourier transforms on the original voice sample and the modified voice sample.

18. The method of claim 11, wherein:

each of the plurality of original voice sample segments is taken from a corresponding respective speaker; and the plurality of voice sample segments have diverse speech characteristics.

19. The method of claim 18, further comprising accumulating the evaluation for each of the plurality of original voice sample segments to produce an evaluation for the complete modified voice sample.

20. The method of claim 11, further comprising normalizing the evaluation of the voice transmission path to other evaluations.

21. The method of claim 11, further comprising windowing the modified voice sample and the original voice sample when transforming the modified voice sample and the original voice sample to the frequency domain.

22. The method of claim 11, wherein, in comparing the spectral components of the transformed modified voice sample to the spectral components of the transformed original voice sample to evaluate the performance of the voice transmission path, the difference in spectral properties is determined.

* * * * *